A. F. PFEIFER.
TRUNKS.
No. 179,424. Patented July 4, 1876.
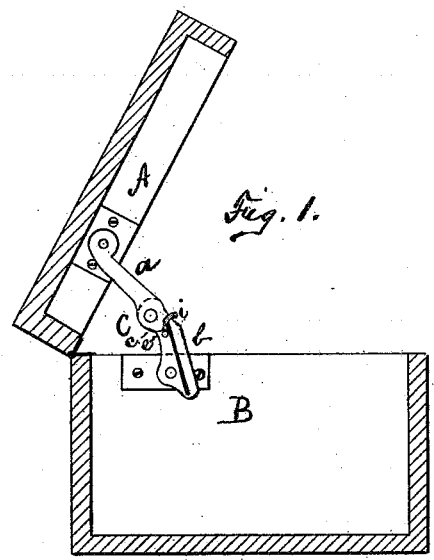
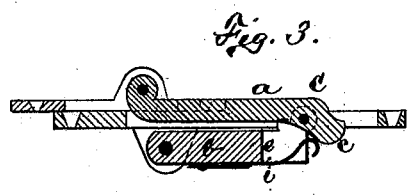
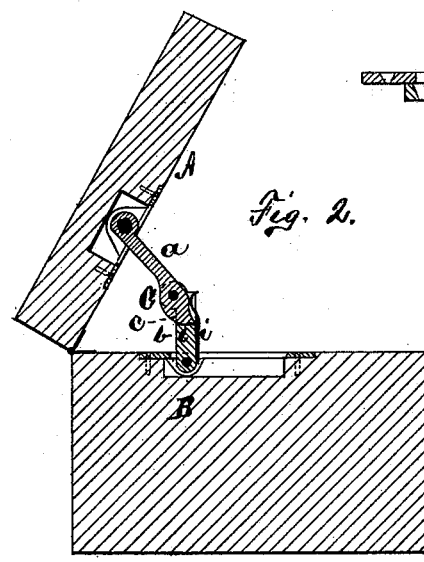
Witnesses.
J. C. Tunbridge
F. L. Powe
Inventor.
August F. Pfeifer.
By O. Drake, Atty.

UNITED STATES PATENT OFFICE.

AUGUST F. PFEIFER, OF NEWARK, NEW JERSEY.

IMPROVEMENT IN TRUNKS.

Specification forming part of Letters Patent No. 179,424, dated July 4, 1876; application filed May 24, 1876.

*To all whom it may concern:*

Be it known that I, AUGUST FREDERICK PFEIFER, of the city of Newark, in the county of Essex and State of New Jersey, have invented certain new and useful Improvements in Trunks, &c., and do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to certain improvements in the construction and operation of stays for the purpose of supporting the lids of trunks, desks, &c., when opened.

The accompanying drawing fully illustrates the nature and character of my invention, in which Figure 1 is a sectional view of a trunk, with the lid open and provided with my improved stay. Fig. 2 is the same, provided with the stay in a modified form, and so arranged and secured to the trunk that the parts are concealed when the lid is closed—that is, the device is boxed into the wood composing the ends of the trunk and lid, as indicated, and Fig. 3 is a detail view, showing the position of the stay when the lid is closed, similar letters of reference indicating corresponding parts in the several figures.

My invention consists in the two arms *a* and *b*, one being pivoted to the lid A, and the other to the end B, of a trunk or desk, and their opposite ends united by a knuckle-joint, C, all constructed, combined, and arranged to operate substantially as hereinafter set forth.

The arm *a* has a projection, *c*, which engages with a lug or shoulder, *e*, on the arm *b*, so as to prevent said joint from turning far enough to catch upon the center when the lid is opened, thereby insuring the automatic action of the joint when shutting said lid, as will be readily understood, and in order to prevent the lid from shutting of its own accord a spring, *i*, is so arranged and secured to the arm *b* as to engage with the projection *c* of the arm *a*, substantially as shown, or in any other convenient and appropriate manner, to secure the aforesaid result.

Having thus described my invention, what I claim as new, and desire to secure by Letters Patent of the United States, is—

The combination, with the body and lid of a trunk, of arms *a b*, jointed together, the arm *b* having a stop, whereby the arm *a* is prevented from assuming a position in line with the arm *b*, and with a spring whereby the arm *a* is maintained in contact with the stop until the application of pressure to the lid, substantially as set forth.

In testimony that I claim the foregoing as my own I hereto affix my signature in presence of two witnesses.

AUGUST F. PFEIFER.

Witnesses:
OLIVER DRAKE,
JOHN C. TUNBRIDGE.